US011993487B2

(12) United States Patent
Haapaniemi et al.

(10) Patent No.: US 11,993,487 B2
(45) Date of Patent: May 28, 2024

(54) MAINTENANCE METHOD OF AN ELEVATOR COMPONENT

(71) Applicant: KONE Corporation, Helsinki (FI)

(72) Inventors: Markku Haapaniemi, Helsinki (FI); Ari Kattainen, Helsinki (FI); Matti Räsänen, Helsinki (FI); Antti Hovi, Helsinki (FI); Erkka Kiviaho, Helsinki (FI); Petteri Valjus, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1410 days.

(21) Appl. No.: 16/358,452

(22) Filed: Mar. 19, 2019

(65) Prior Publication Data

US 2019/0210835 A1 Jul. 11, 2019

Related U.S. Application Data

(63) Continuation of application No. PCT/FI2017/050666, filed on Sep. 22, 2017.

(30) Foreign Application Priority Data

Sep. 29, 2016 (WO) .................. PCT/FI2016/050680

(51) Int. Cl.
*B66B 5/00* (2006.01)
*B66B 1/14* (2006.01)
(Continued)

(52) U.S. Cl.
CPC .............. *B66B 5/0025* (2013.01); *B66B 1/14* (2013.01); *B66B 1/3446* (2013.01); *B66B 3/002* (2013.01);
(Continued)

(58) Field of Classification Search
CPC ....... B66B 5/0025; B66B 1/14; B66B 1/3446; B66B 3/002; B66B 5/00; B66B 5/0037;
(Continued)

(56) References Cited

U.S. PATENT DOCUMENTS 5,250,766 A 10/1993 Hikita et al.
6,328,134 B1 12/2001 Hikita
(Continued)

FOREIGN PATENT DOCUMENTS

CN 1056659 A 12/1991
CN 1301232 A 6/2001
(Continued)

OTHER PUBLICATIONS

International Search Report (PCT/ISA/210) issued in PCT/FI2017/050666, dated Dec. 21, 2017.
(Continued)

*Primary Examiner* — Jeffrey Donels
(74) *Attorney, Agent, or Firm* — Birch, Stewart, Kolasch & Birch, LLP

(57) ABSTRACT

Elevator components can be equipped with an electronic information plate. The electronic information plates are associated with a particular electronic information plate that can store different properties of the associated component. The content of each electronic information plate is read manually or automatically and transmitted to a controller. The controller analyzes the received content and launches a predetermined action if the content indicates a need for maintenance.

8 Claims, 4 Drawing Sheets

(51) Int. Cl.
*B66B 1/34* (2006.01)
*B66B 3/00* (2006.01)
*B66B 7/12* (2006.01)

(52) U.S. Cl.
CPC .............. *B66B 5/00* (2013.01); *B66B 5/0037* (2013.01); *B66B 7/1215* (2013.01)

(58) Field of Classification Search
CPC ... B66B 7/1215; B66B 7/1207; B66B 5/0087; B66B 7/06
See application file for complete search history.

(56) References Cited

U.S. PATENT DOCUMENTS

| | | | | |
|---|---|---|---|---|
| 6,345,697 | B1 | 2/2002 | Siikonen | |
| 9,695,015 | B1 * | 7/2017 | Marinelli | B66B 13/185 |
| 2006/0289243 | A1 | 12/2006 | Hikita et al. | |
| 2013/0119256 | A1 | 5/2013 | Husmann et al. | |
| 2018/0229970 | A1 * | 8/2018 | Lehtinen | D07B 1/162 |
| 2019/0071282 | A1 * | 3/2019 | Zapf | B66B 7/1215 |
| 2020/0087111 | A1 * | 3/2020 | Wos | B66B 1/3461 |
| 2020/0109029 | A1 * | 4/2020 | Pahlke | B66B 5/0087 |
| 2020/0207578 | A1 * | 7/2020 | Liaskas | B66B 13/22 |

FOREIGN PATENT DOCUMENTS

| | | | |
|---|---|---|---|
| CN | 1315284 | A | 10/2001 |
| CN | 1802303 | A | 7/2006 |
| CN | 101830375 | A | 9/2010 |
| CN | 201592932 | U | 9/2010 |
| CN | 102190221 | A | 9/2011 |
| CN | 103058030 | A | 4/2013 |
| CN | 103863912 | A | 6/2014 |
| CN | 104891284 | A | 9/2015 |
| EP | 0090642 | B1 | 5/1983 |
| EP | 0452225 | A2 | 10/1991 |
| JP | 10-236742 | A | 9/1998 |
| JP | 2009-220962 | A | 10/2009 |
| WO | WO99/21787 | A | 5/1999 |

OTHER PUBLICATIONS

Written Opinion of the International Searching Authority (PCT/ISA/237) issued in PCT/FI2017/050666, dated Dec. 21, 2017.
English translation of the Chinese Office Action and Search Report, dated May 6, 2020, for Chinese Application No. 201680086819.1.

* cited by examiner

MAINTENANCE METHOD OF AN ELEVATOR COMPONENT

CROSS REFERENCE TO RELATED APPLICATIONS

This application is a Continuation of PCT International Application No. PCT/FI2017/050666, filed on Sep. 22, 2017, which claims priority under 35 U.S.C. 119(a) to PCT International Application No. PCT/FI2016/050680, filed on Sep. 29, 2016; all of which are hereby expressly incorporated by reference into the present application.

DESCRIPTION OF BACKGROUND

The following description relates to elevators and electronic information plates identifying a particular elevator component and the properties of the elevator component. Particularly the following description relates to use of electronic information plates in maintenance of elevators.

Elevators are mechanical devices and include a plurality of components that wear when the elevator is used. Some of these components have a predetermined life expectancy. The life expectancy can be counted, for example, in years or number of operation cycles. The life expectancy is computed using appropriate safety margins so that the component in question will be replaced before it is dangerous to use.

Examples of such components include belts and ropes that are used in elevators for various purposes, for example, hoisting the elevator car. Conventionally the elevator controller comprises a counter that counts the operation cycles for a particular belt or rope. When the counter indicates a need for new belt or rope a new belt or rope is ordered and installed to replace the old belt or rope. The counter is typically reset after the replacement. The counter is reset in a manner that it will correspond with the life expectancy of the replacement component so that the life expectancy of the new component can be monitored. The new life expectancy does not need to be the same with the earlier one because of different properties. Resetting the counter may involve a use of a passcode given by the elevator manufacturer or operator.

The sequence described above is conventionally executed by a maintenance man visiting at the elevator or it is controlled by particular book keeping. The book keeping includes information about the belt or rope type, installation date, operation cycles and similar.

Recently regulators and legislators have increased the requirements with regard the traceability of elevator components and particularly safety related monitoring. It is desired that the whole lifecycle of a safety related component is documented in more detail as earlier. Furthermore it is desired that the accuracy and integrity of the documentation can be verified. This provides facility to guarantee that used parts, such as ropes and belts, are of right type and changed according to the maintenance plan.

SUMMARY

An electronic information plate for an elevator component is disclosed. Elevator components can be equipped with an electronic information plate. The electronic information plate are associated with a particular electronic information plate that can store different properties of the associated component. The content of each electronic information plate is read manually or automatically and transmitted to a controller. The controller analyzes the received content and launches a predetermined action if the content indicates a need for a maintenance. In an aspect a method for maintenance of an elevator component is disclosed. The method comprises associating an electronic information plate with an elevator component; installing the elevator component with the associated electronica information plate; reading an electronic information plate, wherein the electronic information plate is configured to store information of the elevator component, wherein the information comprises at least one threshold value associated with an action; transmitting the content of the read electronic information; comparing the at least one threshold value with elevator counters; detecting as a result of said comparison if any of the component has exceeded at least one of the threshold values; and launching the action associated with the respective threshold value.

In an example implementation the method further comprises counting the threshold value in number of operation cycles. In an example implementation the method further comprises counting the threshold value life cycle as a time interval. In an example implementation, when exceeding a first threshold value the method further comprises transmitting a preliminary warning of the end of life cycle. In an example implementation, when exceeding a second threshold value the method further comprises limiting operating speed of the elevator. In an example implementation the method further, when exceeding a third threshold value the method further comprises preventing use of the elevator.

In an example implementation the electronic name plate comprises component type and method further comprises comparing the component type and the elevator type and transmitting a warning message when an incompatible component type is detected. In an example implementation the elevator component is one of the following: suspension rope, suspension belt, traction rope or traction belt. In an example implementation the method further comprises transmitting the content of the read electronic information plate into an elevator controller. In an example implementation the method further comprises transmitting the content of the read electronic information plate into an external computing device.

The benefits of described embodiments include better control and monitoring of elevator components and particularly safety related elevator components. Additional electronic information plate may be associated with a particular component or maintenance task. The correct performing of the required component change or task can be traced and overuse, particularly by accident, of elevator components can be prevented. In automated online embodiments it is possible to get real time or almost real time information which makes detecting suspicious situations easier. In manual embodiments, wherein a maintenance person reads electronic information plates by using a portable reader device suspicious situations may be detected when the maintenance person is already at the site. Thus, it is possible to detect possible mistakes even in components that otherwise would not had been inspected on that visit. A further benefit of an electronic information plate is that it improves traceability of elevator components as the use of components can be reliability stored into a centrally managed database.

BRIEF DESCRIPTION OF THE DRAWINGS

The accompanying drawings, which are included to provide a further understanding of the electronic information plate and constitute a part of this specification, illustrate embodiments and together with the description help to explain the principles of the electronic information plate. In the drawings.

DETAILED DESCRIPTION

Reference will now be made in detail to the embodiments, examples of which are illustrated in the accompanying drawings.

In the following an electronic information plate for components in an elevator. Examples of such components are suspension elements, suspension ropes and belts and other suspension means, traction ropes and belts and other traction means, drive belts, ropes, buffers and similar mechanical and typically non-electronic components. Ropes may be, for example hoisting ropes or belts. Expression hoisting ropes should be understood broadly to include ropes, belts and other means that are prone to mechanical wear and can be used for coupling the elevator car to the hoisting machine and thus, used for hoisting the elevator car. The components mentioned above are just examples and the electronic information plate disclosed can be used also with other components. Typically the components are non-electronical and thus, there is no possibility to implement electronic information plate within the electronic circuits of the component. Components may also be partially electronic so that they include electronic features that are not related to monitoring the life expectancy of the component.

The electronic information plate used is an electronic device that can store data. Typically the data is stored into non-volatile memory. The data can be read wirelessly by using a reader device. In some implementations the data may be stored wirelessly by using the same or another reader. The electronic information plate may be able to perform simple computational tasks. The electronic information plate is typically passive and does not require power source. The operating power is received from the reader device by means of electromagnetic induction. An example of suitable device is a passive RFID-tag. RFID tags are small in size and can be read at a distance. Other similar tags may also be used.

The information stored may include one or more of the following: a reset code for a counter, material number, serial number, date of manufacturing, factory identification, performance parameters of the component, life time parameters, type examination certificate, declaration of conformity or similar.

In the following an embodiment using a reader device permanently fixed to an elevator car is used, however, it is not necessary. One or more information plates may be attached to an elevator in a manner that the maintenance person can read the contents by using a portable reader device. Furthermore, it is possible to install the reader device to the shaft side and read electronic information plates whenever the elevator car comprising electronic information plates passes by. The reader device may send the read data further to a database, server, cloud service or similar.

Figure 1A:
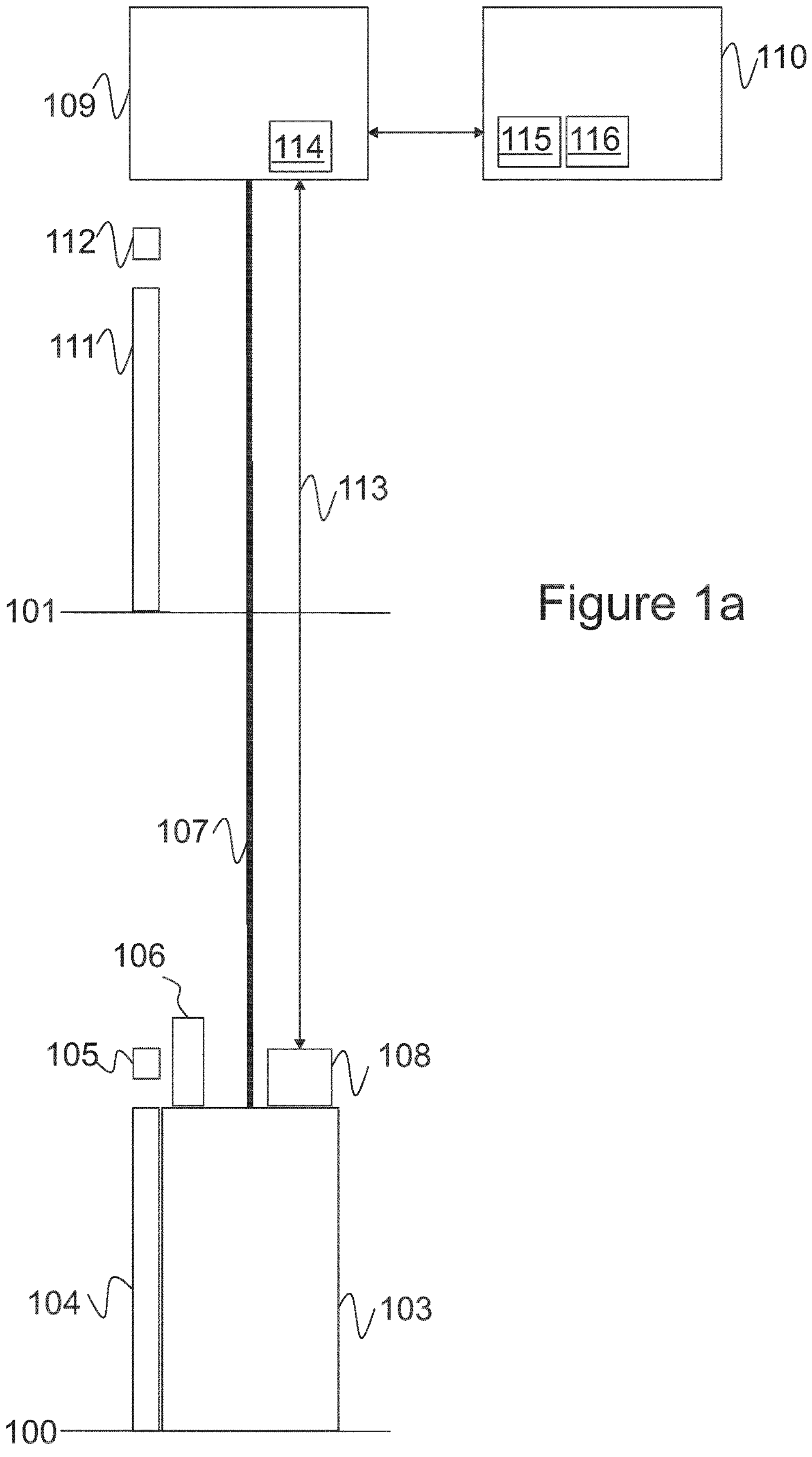
FIG. 1*a* is a block diagram of an example embodiment of an arrangement using the present electronic information plate.

In FIG. 1*a* a block diagram of an embodiment of an elevator comprising at least one component, such as hoisting rope, belt or similar, with an electronic information plate is disclosed. In FIG. 1*a* an elevator car 103 disclosed. The elevator car 103 can stop in a first floor 100 and a second floor 101. The floors may be any floor in a building and not necessarily the first and second floor of the building. The first floor 100 may be, for example, garage and the second floor 101 the ground level. In front of the elevator car 103 a landing door 104 can be seen. In the embodiment of FIG. 1*a* an electronic information plate 105 is located above the landing door and a reader device 106 is located on the top of the elevator car. Thus, the electronic information plate is easy to read when the elevator car 103 stops behind the door 104.

In FIG. 1*a* a similar arrangement can be seen at the second flood 101, wherein an electronic information plate 112 is also above landing door 111. This arrangement is, however, only an example. The information plate may be read even if the elevator does not stop next to it. Another option is to put electronic information plates into an elevator car so that they are easy to read by a maintenance person but cannot be accessed by the public.

In FIG. 1*a* rope 107 is a hoisting rope and used for operating the elevator, to which the electronic information plate 105 is associated. The elevator further comprises a data communication connection 113 that may be implemented by using wireless transmitter or a travelling cable. In the example of FIG. 1*a* a wireless transmitter 108 is configured to communicate with the counterpart 114, which in this embodiment is located together with the hoisting arrangement 109. The wireless transmitter 108 is further configured to communicate with the reader device 106. Thus, when the reader device reads an electronic information plate the information is first passed to a wireless transmitter 108 and then to control device 110 via transceiver 114. The connection between transceiver 114 and controller 110 may be any known data communication connections, such as a local area network or similar.

Controller 110 receives the contents of each read electronic information plate. It is possible to configure the transmissions in a manner that, for example, that the content of each electronic information plate is transmitted once in a day or every time when the reader is in the vicinity of the electronic information plate and can read the electronic information plate. As the information does not typically change frequently also longer intervals may be used.

The transmission is received at the controller 110 and processed by at least one processor 115 and stored into at least one memory 116. The at least one memory comprises 116 a database or similar that can be accessed also by other devices. Correspondingly, at least one memory 116 may be completely or in part outside the controller 110 and the controller only accesses the memory 116 that is located in a different location, such as a server or cloud service.

In an alternative embodiment the transmission is further transmitted to an external service, such as server or cloud computing facility, wherein the transmission is processed. In such embodiment all processing may be done at the external service. The content of the electronic information plate may be transmitted as such or it may first be preprocessed at the controller.

The electronic information plate as in the example of FIG. 1*a* includes a security circuit for preventing the accidental duplication of electronic information plates. Thus, when the electronic information plate is manufactured by, for example, the rope manufacturer, it is not possible to copy or reuse the information plate by accident and it is always associated with the rope or belt for which the electronic name plate is intended to. The security circuit may include information about the intended location of the installation. Thus, if the plate gets accidentally separated from the rope it will be detected in the installation. Then, it is possible to check if the installed rope is correct. If the rope is not suitable it is possible to change the rope. If the rope is not the same but still suitable, it is possible to change the electronic information plate so that it has the correct information corresponding with the installed rope. Suitable security solutions are available, for example, for RFID-tags. Thus, when a component manufacturer, such as rope manufacturer, always provides a tag that is associated with a particular component the identity of the component can be verified. The manufacturer may produce replacement plate in case of malfunction, however, in such case it is possible to cancel the old information plate. If the cancelled information plate is accidentally reused later the system receiving the information detects this and can inform appropriate parties. Thus, it is not possible to use accidentally electronic information name plates other than those that are manufactured by component manufacturers and aimed for a particular elevator.

Figure 1B:
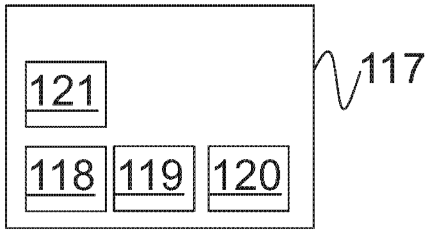
FIG. 1*b* is a block diagram of an example embodiment of the present electronic information plate.

FIG. 1*b* discloses an example embodiment of an electronic information plate 117 for elevator components. The electronic information plate 117 comprises at least one memory 118. The memory comprises necessary information regarding the elevator component being monitored, for example, reset codes, counter values, manufacturing date and similar. It is possible that there are memories of different type. For example, most of the information can be stored into read only memory to which the information has been stored by the elevator component manufacturer who provides typically also the electronic information plates. For example, with regard installation date information it may be beneficial that the information may be written once at the installation site. Thus, this information is then stored permanently and cannot be rewritten again. In more sophisticated versions the information may be rewritten, however, this implementation is more complicated and may require management of access rights. This kind of arrangement may be beneficial, for example, for storing the last inspection date. It is possible to have all kinds of memory on the same electronic information plate.

The electronic information plate 117 further comprises at electricity source 119 and at least one communication interface 120. The electricity source 119 may be an electricity source that is powered by the reader device using electromagnetic induction. The reader device communicates with at least one communication interface. The electronic information plate 117 further comprises a security circuit 121. The security circuit is provided for determining the authenticity of the electronica information plate 117. The security circuit may be implemented several ways, for example, by using common cryptography and solutions that are available, for example, for RFID-tags.

Figure 2:
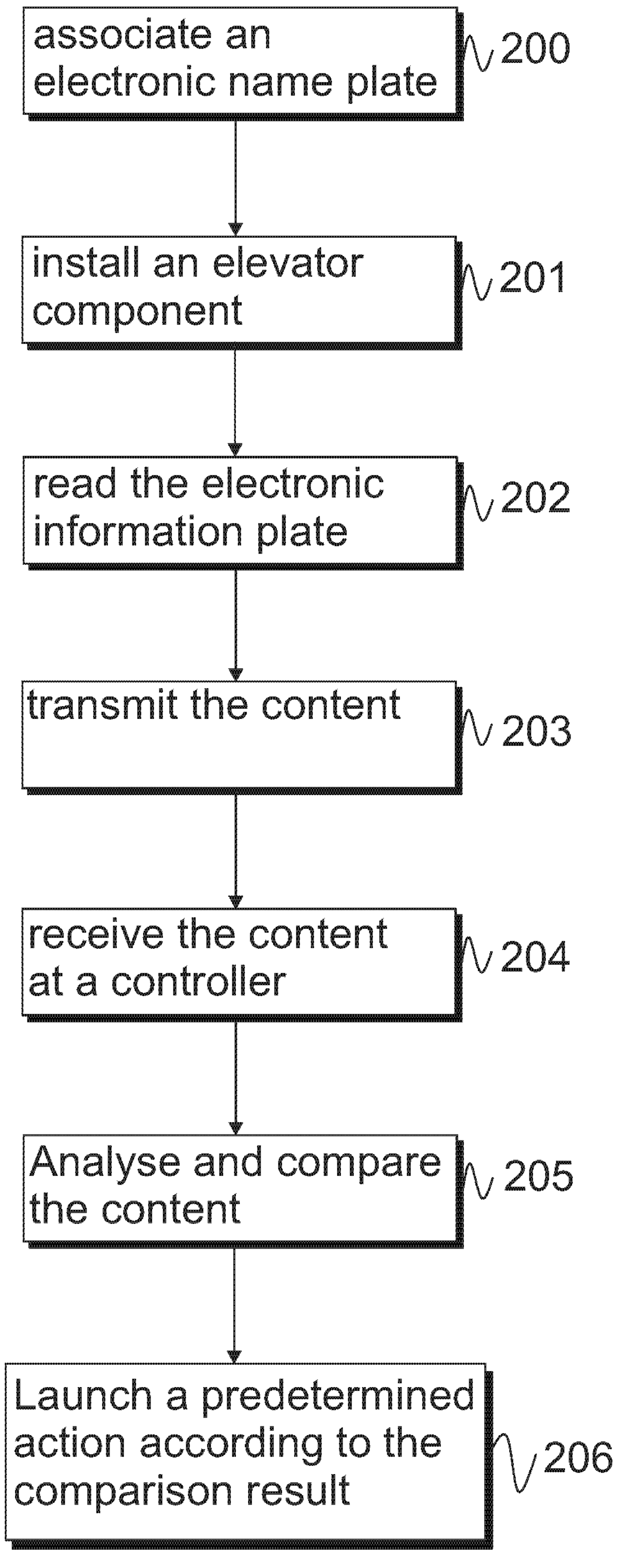
FIG. 2 is a flow chart of a method according to an example of the maintenance method.

In FIG. 2 a method according an example embodiment is disclosed. The method is initiated by associating an electronic name plate with an elevator component, such as a hoisting rope or belt, step 200. Then the elevator component and the electronic name plate are installed to the elevator, step 201. For example, a maintenance man goes to an elevator being serviced and installs the elevator component and the respective electronic name plate to the elevator. Then the electronic name plate is read using a reader for reading the content of an electronic information plate, step 203. In the example of FIG. 2 the reader is configured to read one electronic information plate at time. However, one elevator may comprise more than one electronic information plate. In such case the reader may read one electronic information plate at time or use a method for reading multiple electronic information plates simultaneously. Typically the reading process takes only short time and it is possible to read multiple electronic information plates also sequentially.

The reader is connected to a transmitter using wired or wireless connection. The transmitter then transmits the read content, step 203. The transmission may be done by using a wireless transmitter or a travelling cable. The transmitter may be an independent transmitter using mobile communication networks, Wi-Fi or similar. However, it is also possible to use the transmission channels that are dedicated particularly for that elevator car. When the transmission is done over a public network the communication may be encrypted.

The transmission is received at a controller, step 204. The transmission needs not to be a direct transmission but may involve any number of network elements in between. Thus, using an ordinary wireless internet connection is acceptable provided that the controller is able to receive the transmission.

The relevant information is then extracted from the transmission. The extracted information is then analyzed and compared with corresponding information in the controller database, step 205. For example, it is possible to compare if the content of the tag is what it is supposed to be. For example, each of the electronic information plates may have a serial number which is associated with the location of the elevator. If the serial number does not match with assumed location there may be a mistake or fraud.

In case of suspected mistake or fraud it is possible to launch a predetermined action, step 206. This may be, for example, assigning a task to a maintenance person to check the issue during the next inspection. Because of the need to check the next inspection may be rescheduled. It is possible to configure the system in a manner that the predetermined action is not taken when the issue is noticed first time but wait for a second confirmation so that reading errors can be eliminated and unnecessary work is avoided.

In the embodiment described above an electronic information plate is used. The content and design of the electronic information plate varies depending on the application. For example, the electronic information plate may be a passive read only RFID tag to which the content is stored by the provider and it cannot be rewritten. The content stored may be chosen by the elevator provider. However, it is possible to use also more sophisticated electronic information plates that can also be rewritten when appropriate writing access rights are taken appropriately care of.

Figure 3:
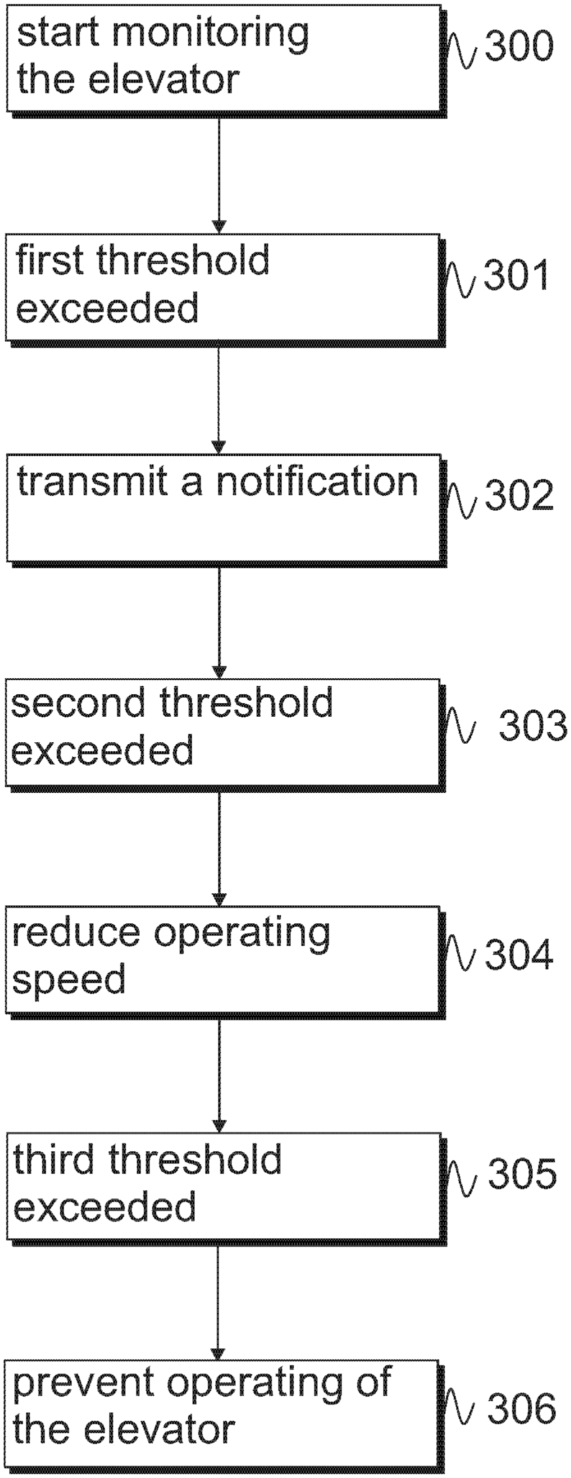
FIG. 3 is a flow chart of a method according to an example of the maintenance method.

In FIG. 3 a part of the method described with referral to FIG. 2 is explained in more detail. The method is initiated by starting the monitoring, step 300. Monitoring of the elevator is performed by reading the electronic information plate and comparing it to the counters of the elevator and possibly with counters stored in an external service, such as a database or cloud. Monitoring is a continuous process or performed by regular intervals, such as once a day.

The monitoring is continued until a first threshold stored on the electronic information plate is reached, step 301. As a response to reaching the first threshold a notification is sent, step 302. The notification may be sent to, for example, to the elevator operator and/or elevator provider. Thus, the provider gets a notification and may send an offer for changing the part when it becomes necessary. Using this kind of first threshold value is beneficial as it provides possibility to prepare for the upcoming change well in advance.

If the monitoring observes that the second threshold has been exceeded, step 303, it will reduce the operating speed of the elevator 304 so that the operator and also the users will notice that there is an issue with the elevator. The purpose of the notification associated with the first threshold is to give a possibility to prevent exceeding the second threshold.

If the elevator part is not changed before the third threshold is exceeded, step 305, the operation of the elevator is prevented 306. The prevention means that the elevator is not considered anymore safe or does not fulfill the regulations and the part, such as the hoisting rope, must be changed before the elevator may be operated again. Maintenance operation may be allowed and even required for the required maintenance operations. Thus, the prevention may be done, for example, by preventing ordinary elevator calls to the elevator and accepting only special calls placed by a maintenance man.

In rewriting embodiment access rights for rewriting may be used and a hash-sum may be produced for detecting unauthorized changes in the content. Furthermore, the content to be written may be received from a content controlling entity so that a hash-sum corresponding with the content can be produced and provided to the controller. The content may be specifically assigned for a certain component and include a unique serial number. Thus, if the electronic information plate is copied it is possible to detect that the same serial number is used in multiple places. The content of the may include any data relevant for the elevator component in question. For example, if a special reset code needs to be applied it is possible to provide the code in the electronic information plate.

In rewriting embodiment the electronic information plate may be associated also with two or more components so that the memory of the electronic information plate is configured to store one or more software implemented information plates. These software implemented information plates may be completely independent and are processed independently. The reader device may be configured to read them one at time or as a package that will be extracted later.

In a further embodiment the use of the electronic information plate is integrated to the system in a manner that when the contents of the electronic information plate are used in any way the controller may make changes to the properties of the elevator. For example, when the electronic information plate comprises a reset code for resetting a counter, the controller detects the use of reset code and changes it so that the code stored in the electronic information plate cannot be used twice.

In further embodiments some of the properties of the elevator may be stored for future review. For example, the value of the counter may be stored at predetermined time interval, for example, once a day or week. The information may be stored using method that do not allow altering the data afterwards. Storing may be done to a memory on the electronic information plate. The memory may be of write-once type so that the data is difficult to alter. Storing data on the electronic information plate is beneficial in cases where the elevator has only limited or no data communication channel. For example, the elevator may be situated in a location where only expensive data communication channels are available and the operator is willing to reduce costs. In another embodiment the data is continuously stored into a cloud, central computer, server or similar computing device.

In another embodiment the use of an elevator may be prevented by the controller after predetermined number of unsuccessful automatic reading attempts. Thus, the electronic information plate cannot just be removed when trying to hide a fraud. The prevention of use may be conditional to an approval from a maintenance person. The use of elevator needs not to be prevented when the problem is in the electronic information plate or reader device.

As stated above, the components of the exemplary embodiments can include computer readable medium or memories for holding instructions programmed according to the teachings of the present embodiments and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge or any other suitable medium from which a computer can read.

It is obvious to a person skilled in the art that with the advancement of technology, the basic idea of the electronic information plate may be implemented in various ways. The electronic information plate and its embodiments are thus not limited to the examples described above; instead they may vary within the scope of the claims.

The invention claimed is:

1. A method for maintenance of an elevator component, the method comprising the steps of:

associating an electronic information plate with an elevator component;

installing the elevator component with the associated electronic information plate;

reading the electronic information plate, wherein the electronic information plate is configured to store information of the elevator component, wherein the information comprises at least one threshold value associated with an action;

transmitting the content of the read electronic information;

comparing the at least one threshold value with elevator counters;

detecting as a result of said comparison if the electronic component has exceeded at least one of the threshold values; and launching the action associated with the respective threshold value, wherein the method further comprises the steps of:

counting a threshold value in number of operation cycles; and counting a threshold value life cycle as a time interval.

2. The method according to claim 1, wherein when exceeding a first threshold value, the method further comprises the step of transmitting a preliminary warning of an end of life cycle.

3. The method according to claim 2, wherein when exceeding a second threshold value, the method further comprises the step of limiting operating speed of the elevator.

4. The method according to claim 3, wherein when exceeding a third threshold value, the method further comprises the step of preventing use of the elevator.

5. The method according to claim 1, wherein the electronic name plate comprises a component type and the method further comprises the steps of comparing the component type and the elevator type and transmitting a warning message when an incompatible component type is detected.

6. The method according to claim 1, wherein the elevator component is one of the following: a suspension rope, a suspension belt, a traction rope or a traction belt.

7. The method according to claim 1, further comprising the step of transmitting the content of the read electronic information plate into an elevator controller.

8. The method according to claim 1, further comprising the step of transmitting the content of the read electronic information plate into an external computing device.

* * * * *